US012148256B2

(12) United States Patent
Töngi

(10) Patent No.: US 12,148,256 B2
(45) Date of Patent: Nov. 19, 2024

(54) METHOD FOR CASCADING INTERLOCKINGS IN ELECTRONIC LOCKS

(71) Applicant: DORMAKABA SCHWEIZ AG, Wetzikon (AT)

(72) Inventor: Thomas Töngi, Ettenhausen (AT)

(73) Assignee: DORMAKABA SCHWEIZ AG, Wetzikon (CH)

(*) Notice: Subject to any disclaimer, the term of this patent is extended or adjusted under 35 U.S.C. 154(b) by 851 days.

(21) Appl. No.: 17/275,005

(22) PCT Filed: Oct. 14, 2019

(86) PCT No.: PCT/EP2019/077751
§ 371 (c)(1),
(2) Date: Mar. 10, 2021

(87) PCT Pub. No.: WO2020/088922
PCT Pub. Date: May 7, 2020

(65) Prior Publication Data
US 2022/0068063 A1  Mar. 3, 2022

(30) Foreign Application Priority Data
Oct. 30, 2018  (AT) .......................... GM 50181/2018

(51) Int. Cl.
*G07C 9/00* (2020.01)
*E05B 47/00* (2006.01)
(52) U.S. Cl.
CPC .......... *G07C 9/00912* (2013.01); *E05B 47/00* (2013.01); *E05B 2047/0071* (2013.01)
(58) Field of Classification Search
CPC . G07C 9/00912; G07C 9/00174; E05B 47/00; E05B 2047/0071
See application file for complete search history.

(56) References Cited

U.S. PATENT DOCUMENTS

2003/0179074 A1* 9/2003 Palomaki .............. E05B 65/108
340/5.21
2011/0254659 A1* 10/2011 Bowen ..................... G07C 9/37
340/5.6

FOREIGN PATENT DOCUMENTS

EP  2587772 A1  5/2013

OTHER PUBLICATIONS

Droms R: RFC 2131—Dynamic Host Configuration Protocol (DHCP) Internet Citation, Mar. 1, 1997, URL: https://www.ietf.org/rfc/rfc2131.txt.

(Continued)

*Primary Examiner* — Azizul Choudhury
(74) *Attorney, Agent, or Firm* — CANTOR COLBURN LLP

(57) ABSTRACT

When cascading interlockings of electronic locks, in particular for vaults, it is known to link all locks to a communications bus, wherein each lock has an associated serial number. Additionally, it is provided for additionally associating a sequential number to each lock so as to simplify managing the locks. Preferably, with a main lock, in which a translation table is stored, the sequential number of each lock in the system is associated to the serial number thereof; thereby, negotiating the numbers as follows: if two locks with the number 1 are connected to the communications bus, one lock keeps the number 1 and then adds a line in the translation table, in which a sequential number not yet assigned for the other lock and the serial number thereof are stored, and, if required, also adds all the locks not yet listed in the table.

7 Claims, 2 Drawing Sheets

(56) References Cited

OTHER PUBLICATIONS

Dormakaba, "Dormakaba Lodging Systems—Acces Control Systems—ILCO ATLAS System", 23. Dec. 2004, pp. 1-4, URL:https://www.dormakaba.com/gb-en/solutions/products/lodging-systems/access-management-systems/ilco-atlas-system-267660; XP055661751.
International Search Report issued Feb. 5, 2020 re: Application No. PCT/EP2019/077751, pp. 1-2, citing: EP 2587772 A1 and Dormakaba "Dormakaba Lodging Systems . . . ."

* cited by examiner

METHOD FOR CASCADING INTERLOCKINGS IN ELECTRONIC LOCKS

TECHNICAL FIELD

The present disclosure relates to a method for cascading interlockings of electronic locks, in particular for vaults, wherein all locks are linked to a communications bus and wherein each lock has an associated serial number.

BACKGROUND

Locks having an elevated security level are in particular required fan vaults, however, also for dealers (ATM, Automatic Teller Machines, in German Bankomat or else Verkaufsautomat).

Conventional locks are lockable and electronic means can unlock them. The protection level depends on the ease with which unauthorized users can unlock the vaults. In case of several interlockings in a vault with one or more doors, which are disposed next to each other or one within the other, the use of an input device for unlocking individual or all locks, represents increased demands on commissioning of the system.

Each lock has a unique serial number. During the production process, said number is stored in the respective lock and cannot be modified later. Each lock can be addressed via said serial number.

It is disadvantageous that the serial numbers are so complicated that a human is hardly able to memorize an association between serial numbers and locks. Also inputting the serial numbers in the input device is cumbersome and prone to errors.

BRIEF DESCRIPTION OF THE INVENTION

The present disclosure eliminates this disadvantage.

According to the disclosure, the problem is solved in that, additionally, each lock has an associated sequential number.

For simple handling and unique allocation of the opening authorization, upon commissioning, all the locks are numbered in sequence. On the one hand, numbering the locks should be easy for commissioning, on the other hand, unwanted or new numbering deliberately caused by the wrong hands, is to be excluded, if possible. For this purpose, the numbering can be defined based on the cabling structure. Disadvantageous is that only skilled persons can perform, respectively adapt a corresponding cabling structure.

As an alternative, it is possible to effect the numbering by means of mechanical or electric coding per lock. The individually manipulated locks by means of switch or coding then define the numbering. However, this solution is disadvantageous in that the numbering is prone to errors and can only be done reliably by persons skilled in the art. It is easily possible with this solution that two locks get the same number associated.

A simplified method for cascading interlockings of electronic locks can be obtained in that a certain number, in the following w.l.o.g. (w.l.o.g.=without loss of generality) marked with number 1, defines a "main lock", wherein a translation table is stored in the main lock, which associates the sequential number of any other lock in the system to the serial number thereof; and in that the sequential numbers are negotiated as follows: If two locks with the number 1 are connected to the communications bus, one lock keeps the number 1 and then adds a line in the translation table thereof, in which a sequential number not yet assigned for the other lock and the serial number thereof are stored, and, if required, also adds all the locks not yet listed in the table.

This lock system overcomes the disadvantages of the two systems described above. In particular, this vault lock is comfortable in operation, and the operation, respectively installation is so easy that the customer can perform it.

If there are only two locks in the system, the other lock receives the number 2. From this point in time on, the lock number 2 is only directly addressable when using the serial number thereof. Thus creating a two-lock-system. Via the sequential number, the lock number 2 is only addressable via the lock number 1.

Preferably, based on the following criteria, it is decided which lock keeps the number 1:
if the programming state of the two locks with the number 1 is unequal, then the lock with the higher priority keeps the number 1;
if the programming state of the two locks with the number 1 is equal, then the lock with the higher or the lower serial number keeps the number 1.

Thus, with different priority, the lock with the higher priority should become the "main lock". Principally, with the same priority it does not matter, which lock becomes the "main lock"; so as to have a unique rule (namely, to prevent both locks from wanting to become the main lock) the serial number is a suitable criterion.

The priority of the programming state should have a minimum value in the delivery condition and be increased, if an extension component has a coupling to another system. This increase can be done automatically, e.g. by 2. In addition, it is also possible to provide for the possibility to manually increase the priority by 1 via an input device or via an extension component. However, the priority can be influenced as well by other programming states.

When removing a lock with a number other than 1, the translation table can remain unchanged in the lock number 1. If, however, the lock with the number 1 is removed, a lock remaining in the system must assume the number 1 and form the translation table. Again, based on the priority, respectively with the same priority, based on the serial number, it can be decided which lock assumes the number 1.

BRIEF DESCRIPTION OF THE DRAWINGS

The present disclosure is explained in more detail based on the appended drawings. It shows.

DETAILED DESCRIPTION OF THE DRAWINGS

Figure 1:
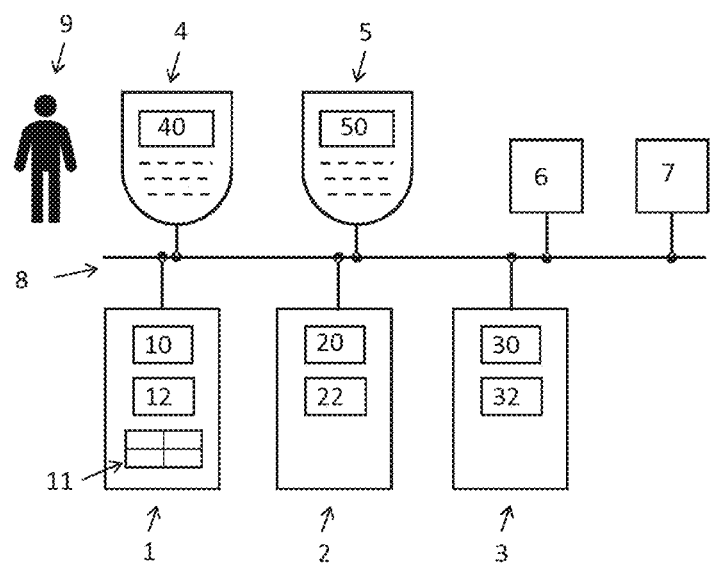
FIG. 1 based on a block diagram, a system for performing the inventive method.

The system comprises an input device 4 (see FIG. 1) for unlocking a lock 1. The opening authorization for unlocking is electronically communicated between lock 1 and input device 4 via a communications bus 8. In addition, further locks 2, 3, further input devices 5 and additional extension components 6, 7 can be connected to the communications bus. An extension component 6 can provide a coupling to other systems, for example. All the devices and components connected to the communications bus 8 can communicate information via said communications bus 8. A unique serial number 10, 20, 30 for unique identification is electronically stored in each lock 1, 2, 3. During the production process, said unique serial number is stored in the respective lock and cannot be modified later.

Figure 2:
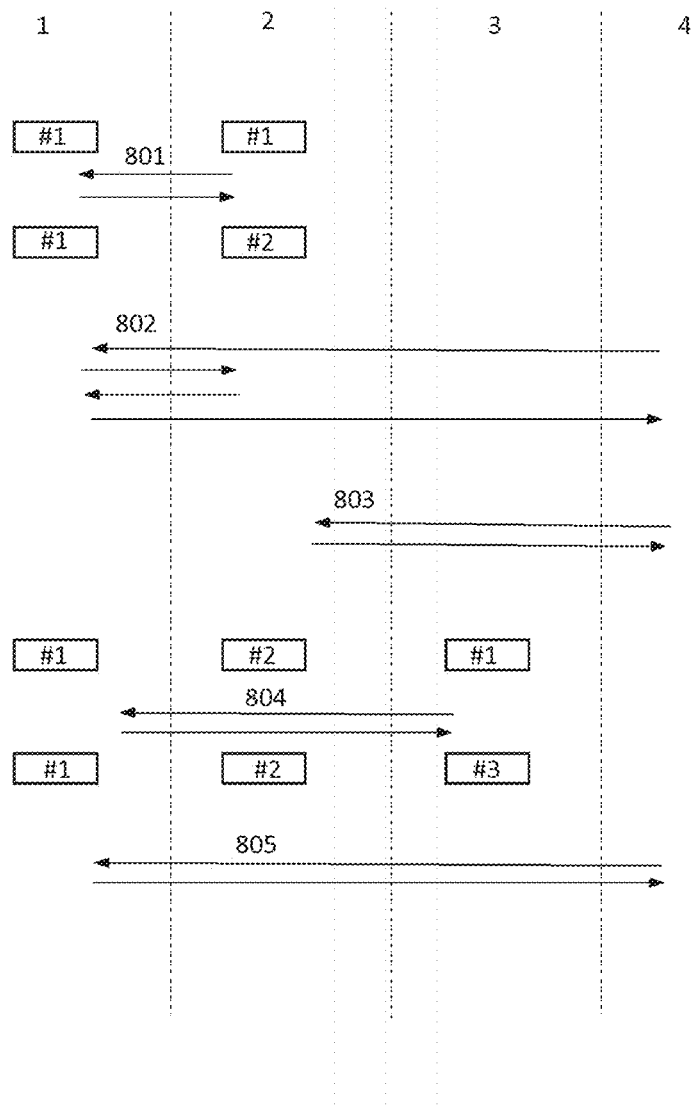
FIG. 2 illustrates the exchange of information during the inventive method.

If two locks 1, 2 with the sequential number 1 are connected to the communications bus 8 (top line in FIG. 2), there is a communications sequence 801 between said two locks 1, 2. It is negotiated with said communications sequence 801, which lock keeps the sequential number 1 and which one obtains a new sequential number. In this example, it is assumed that the lock 1 keeps the sequential number 1 and the lock 2 obtains the sequential number 2. The lock with the sequential number 1 establishes the translation table 11, which initially has only one line, in which the sequential number 2 and the serial number 22 of the lock 2 are stored.

Via the communications bus 8, the lock 2 is directly addressable at any time when using the serial number 20 (arrows 803). Additionally, in a system always only one lock 1 is directly addressable without using the serial number, namely the lock with the sequential number 1 (arrows 805). A translation table 11 for the lock 2 is stored in said lock 1. The lock 2 is indirectly addressable when using the sequential number 2 (arrows 802), wherein the lock 1 forwards the communication based on the translation table 11.

Now, if a further lock 3 with the sequential number 1 is connected to the communications bus 8, communications sequence 804 occurs, in which again it is negotiated, which lock keeps the sequential number 1 and which one obtains a new sequential number. In this example, it is assumed that the lock 1 keeps the sequential number 1 and the lock 3 obtains a new sequential number, in this case the number 3. The translation table 11 is completed with a further line, in which the serial number 30 of the lock 3 is associated to the sequential number 3.

This can be optionally repeated such that any number of locks can be connected to the communications bus 8. Via the communications bus 8, each lock 1, 2, 3 is directly addressable at any time, when using the serial number 10, 20, 30 (arrows 803). However, additionally always just the lock 1 with the sequential number 1 without serial number is directly addressable (arrows 805). A translation table 11, with all locks 2, 3 available on the communications bus 8, is stored in this lock 1. Thus, any lock 2, 3 is indirectly addressable, when using a sequential number (arrows 802), wherein the lock 1 forwards the communication based on the translation table 11.

Per lock, at least the serial number thereof and the sequential number of the numbering are stored in the translation table 11. The input device 4 follows the translation table 11 in the lock with the number 1 and thereby allows for navigating the lock system. Once authorized, a user 9 can freely select the numbering in the translation table 11 on the lock 1 via an input device 4 or an extension component 6 (arrows 805). Said change of the numbering can modify the programming state of the individual locks. With the obtained authorization via an input device 4 or an extension component 6 on the lock 1, the user can freely select the numbering of the translation table.

In order to unlock a desired lock, the user 9 can select the desired lock on the input device 4 and unlock said lock as usual. For navigating the input device 4, a display 40 either displays the number from the translation table 11 or the serial number 10, 20, 30 or an individual text 12, 22, 32, the user previously stored, from the selected lock.

The invention claimed is:

1. A method for cascading interlockings of electronic locks, wherein all locks are linked to a communications bus and wherein each lock has an associated serial number, wherein additionally a sequential number is associated to each lock, wherein a certain number, in the following w.l.o.g. marked with number 1, defines a main lock, wherein a translation table is stored in the main lock, which associates the sequential number of any other lock in the system to the serial number thereof;

and in that the sequential numbers are negotiated as follows:

if two locks with the number 1 are connected to the communications bus, one lock keeps the number 1 and thereupon adds a line in the translation table, in which a sequential number not yet assigned for the other lock and the serial number thereof are stored, and, if required, also adds all the locks not yet listed in the table.

2. The method according to claim 1, wherein cabling determines the sequential number.

3. The method according to claim 1, wherein a mechanic or electronic coding determines the sequential number in each lock.

4. The method according to claim 1, wherein it is decided based on the following criteria, which lock keeps the number 1:

if the programming state of the two locks with the number 1 is unequal, then the lock with the higher priority keeps the number 1, and if the programming state of the two locks with the number 1 is equal, then the lock with the higher or the lower serial number keeps the number 1.

5. The method according to claim 4, wherein the priority of the programming state should have a minimum value in the delivery condition and be increased, if an extension component has a coupling to another system.

6. The method according to claim 1, wherein, when removing a lock with a number other than 1, the translation table in the lock 1 remains unchanged.

7. The method according to claim 1, wherein, when removing the lock with the number 1, a lock remaining in the system assumes the number 1 and forms the translation table.

* * * * *